United States Patent
Nishimura et al.

(10) Patent No.: US 6,189,350 B1
(45) Date of Patent: Feb. 20, 2001

(54) DEVICE FOR LOCKING CHANNEL OPENING-CLOSING HANDLE OF FLUID CONTROLLER

(75) Inventors: Ryutaro Nishimura; Shigeru Itoi, both of Osaka (JP)

(73) Assignee: Fujikin Incorporated, Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/062,750

(22) Filed: Apr. 20, 1998

(30) Foreign Application Priority Data

Apr. 22, 1997 (JP) .................................................. 9-104055

(51) Int. Cl.[7] .................................................. F16K 35/00
(52) U.S. Cl. .............................. 70/180; 70/175; 70/203; 137/385
(58) Field of Search ............................. 70/175–180, 202, 70/203, 211, 212; 137/385; 251/90, 95

(56) References Cited

U.S. PATENT DOCUMENTS

| | | | |
|---|---|---|---|
| 822,025 | * 5/1906 | Sisco | 70/178 |
| 961,959 | * 6/1910 | Herfurth | 70/178 |
| 3,895,507 | 7/1975 | Moy | 70/177 |
| 4,073,168 | * 2/1978 | Takada | 70/203 |
| 4,162,690 | * 7/1979 | Anderson | 70/180 |
| 4,208,033 | 6/1980 | Kesterman | 251/90 |
| 4,208,893 | * 6/1980 | Avrich et al. | 70/180 |
| 4,498,320 | * 2/1985 | Mullis | 70/180 |
| 4,534,379 | * 8/1985 | Burge | 70/180 |
| 4,781,044 | * 11/1988 | Ortega | 70/177 |
| 4,848,724 | * 7/1989 | Pettinaroli | 70/177 |
| 4,926,900 | * 5/1990 | Pietras | 70/179 |
| 5,427,135 | * 6/1995 | Kieper | 137/385 |
| 5,537,846 | * 7/1996 | Simon | 70/202 |
| 5,823,023 | * 10/1998 | Benda | 70/180 |

FOREIGN PATENT DOCUMENTS 0 347 289 12/1989 (EP) .
2 271 830 4/1994 (GB) .

* cited by examiner

*Primary Examiner*—Teri Pham Luu
(74) *Attorney, Agent, or Firm*—Armstrong, Westerman, Hattori, McLeland & Naughton

(57) ABSTRACT

A locking device comprises a stopper support fixed to the body of a fluid controller, and a stopper nonrotatably mounted on the stopper support and engageable with a channel opening-closing handle for preventing the rotation of the handle. The stopper mounted on the support is movable upward and downward between a locking position wherein the stopper engages with the handle and an unlocking position wherein the stopper is out of engagement with the handle. The stopper support is formed with an opening for fitting the controller body therein and an aperture for fitting the stopper therein. The stopper has a vertical portion slidably fitted in the aperture and formed with a lock attaching bore.

4 Claims, 5 Drawing Sheets

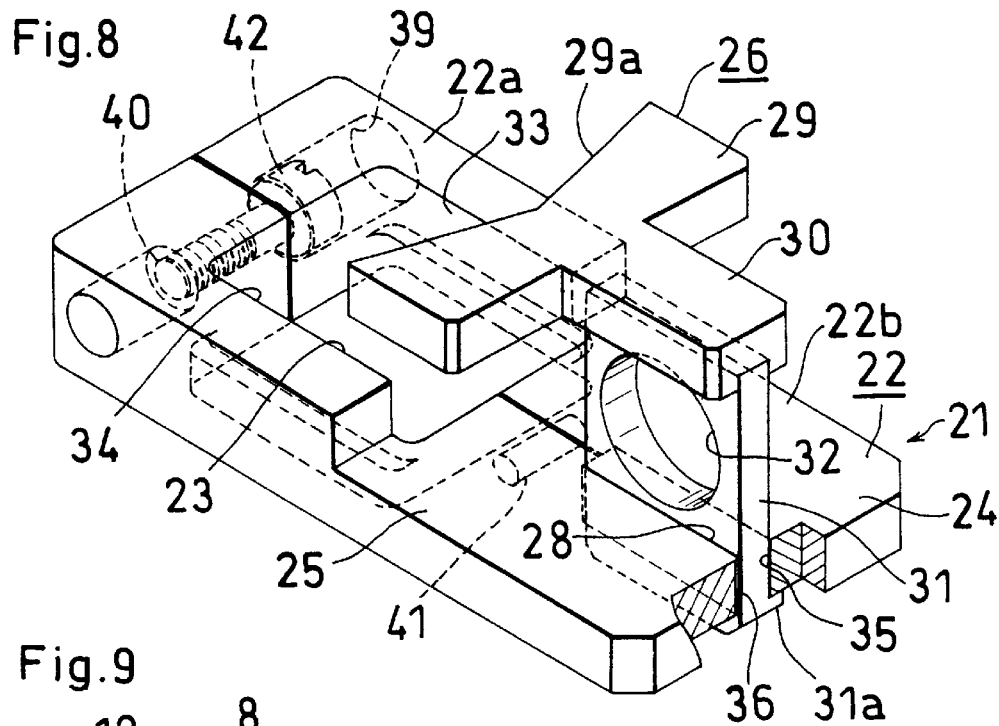
Fig. 8
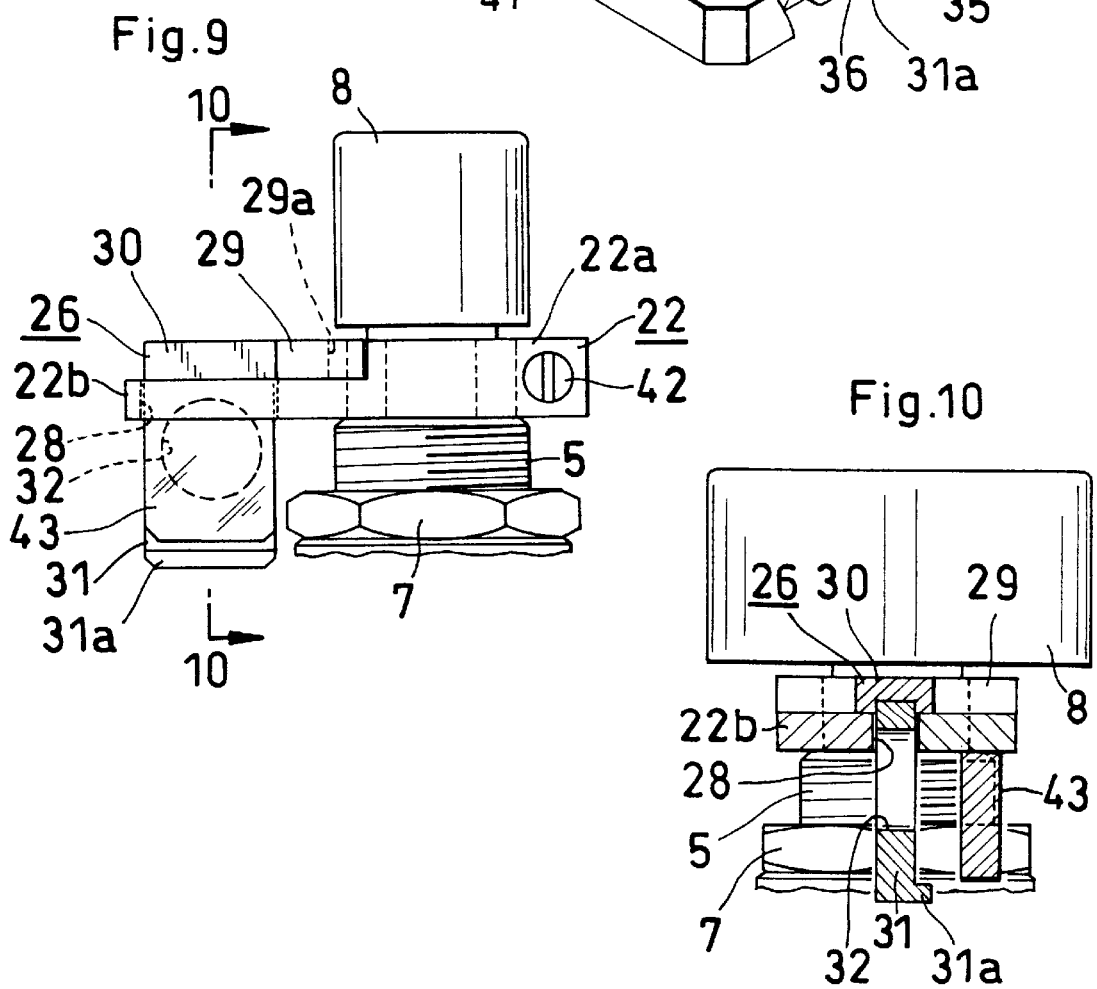
Fig. 9
Fig. 10

DEVICE FOR LOCKING CHANNEL OPENING-CLOSING HANDLE OF FLUID CONTROLLER

BACKGROUND OF THE INVENTION

The present invention relates to a device for use in fluid controllers, such as on-off valves, which are included, for example, in semiconductor manufacturing apparatus, the device being adapted to lock a channel opening-closing handle of the controller in a full opening or full closing position.

Fluid controllers are fully opened or fully closed as required by manipulating a channel opening-closing handle, whereas no device has been known for locking the handle in the full opening or closing position.

The conventional fluid controller therefore has the problem that the handle becomes shifted during the operation of the semiconductor manufacturing apparatus, failing to permit a proper flow of fluid to adversely affect the product.

SUMMARY OF THE INVENTION

An object of the present invention is to provide a device for locking the channel opening-closing handle of a fluid controller to eliminate errors involved in opening or closing the channel of the controller.

The present invention provides a device for locking a channel opening-closing handle of a fluid controller in a full opening or full closing position, the handle being rotatable relative to a body of the fluid controller, the locking device comprising a stopper support having a body fitting opening and fixed to the controller body, and a stopper nonrotatably provided on the stopper support and engageable with the handle for preventing the rotation of the handle.

The term the "body of a fluid controller" means the portion of the fluid controller which is fixed relative to the channel opening-closing handle which is rotatable. For example, when the controller has a valve case (body) having a channel and a valve closure (bonnet) covering and fixed to the valve case, the combination of these two components will be referred to as the controller body.

With the locking device of the present invention, the stopper engageable with the handle to prevent the rotation thereof is not rotatable relative to the stopper support which is fixed to the controller body. This eliminates the likelihood that the handle will shift inadvertently, consequently obviating the trouble that an improper flow of fluid will adversely affect the product.

According to an embodiment of the invention, the stopper support comprises a first member generally U-shaped and having a pair of side walls for holding therebetween two opposite flat faces of the controller body from opposite sides thereof, and a straight second member extending between and attached to free ends of the side walls for preventing the first member from slipping off the controller body, the stopper being integral with the first member. To provide this arrangement, the first member is mounted on the controller body, with the two side walls of the first member fitted to the respective flat faces of the body, whereby the first member is prevented from rotating relative to the controller body. The second member is then made to extend between and attached to the free ends of the side walls, whereby the first member is prevented from slipping off the controller body.

The second member is, for example, a pin having a head and insertable through an insertion bore formed in each of the two side walls of the U-shaped first member. A through bore is formed in the shank of the second member, such that one of the side walls is positionable between the head of the second member and the through bore thereof. The second member is passed through the insertion bore of one of the side walls and inserted through the insertion bore of the other side wall, and a lock is attached to the second member using the through bore. The second member is then prevented from slipping off by the lock and the head of the second member, consequently making it impossible to turn the handle unless the lock is undone. This eliminates any of the errors to be involved in opening or closing the channel of the fluid controller. Instead of using the lock, the insertion bore of one of the side walls may be in the form of a threaded bore, with an externally threaded portion formed at the forward end of the second member. The second member can then be prevented from slipping off when inserted through the insertion hole of the other side wall and screwed into the threaded bore of the above-mentioned side wall.

Preferably, the stopper is mounted on the stopper support so as to be movable upward and downward between a locking position in which the stopper engages with the handle and an unlocking position in which the stopper is out of engagement with the handle. The locking position or the unlocking position is then alternatively selectable merely by moving the stopper upward or downward, hence a facilitated change-over.

This can be realized by an arrangement wherein the stopper support is formed by a first member and a second member joined to each other, and each of the first and second members is formed with a recess and another recess for forming the body fitting opening and a stopper fitting aperture, respectively, when the two members are joined, the stopper having a vertical portion slidably fitted in the aperture and formed with a lock attaching bore.

BRIEF DESCRIPTION OF THE DRAWINGS

FIG. 8 is a perspective view of the same as assembled;

FIG. 9 is a front view showing a modification of the second embodiment; and

FIG. 10 is a view in section taken along the line 10—10 in FIG. 9.

DESCRIPTION OF THE PREFERRED EMBODIMENTS

Embodiments of the present invention will be described below with reference to the drawings. In the following description, the left- and right-hand sides of FIGS. 1 and 4 will be referred to as "left" and "right," respectively, the lower side of FIGS. 3 and 5 as "front," and the upper side thereof as "rear."

Figure 1:
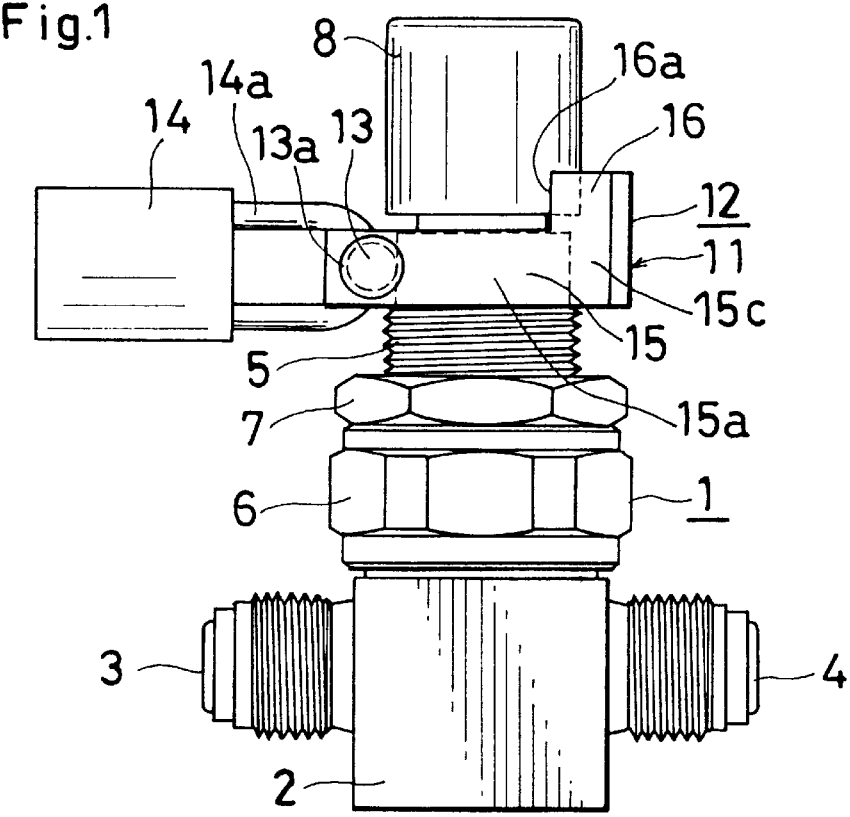
FIG. 1 is a front view showing the appearance of a fluid controller and a first embodiment of channel opening-closing handle locking device according to the invention.
Figure 2:
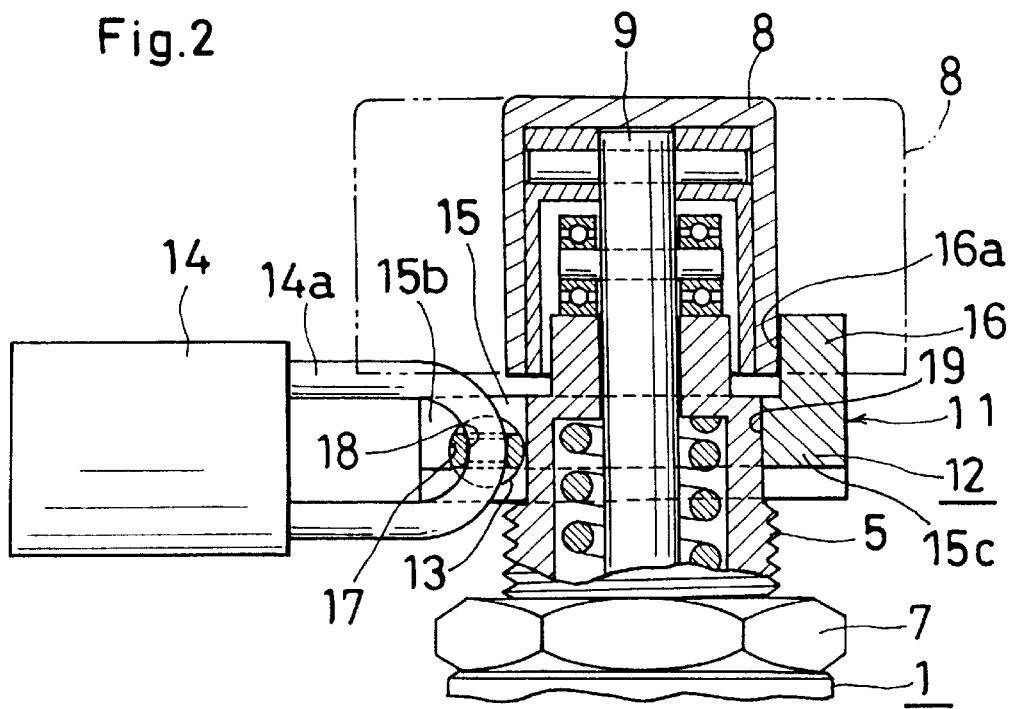
FIG. 2 is an enlarged fragmentary view in vertical section of the controller and the device.
Figure 3:
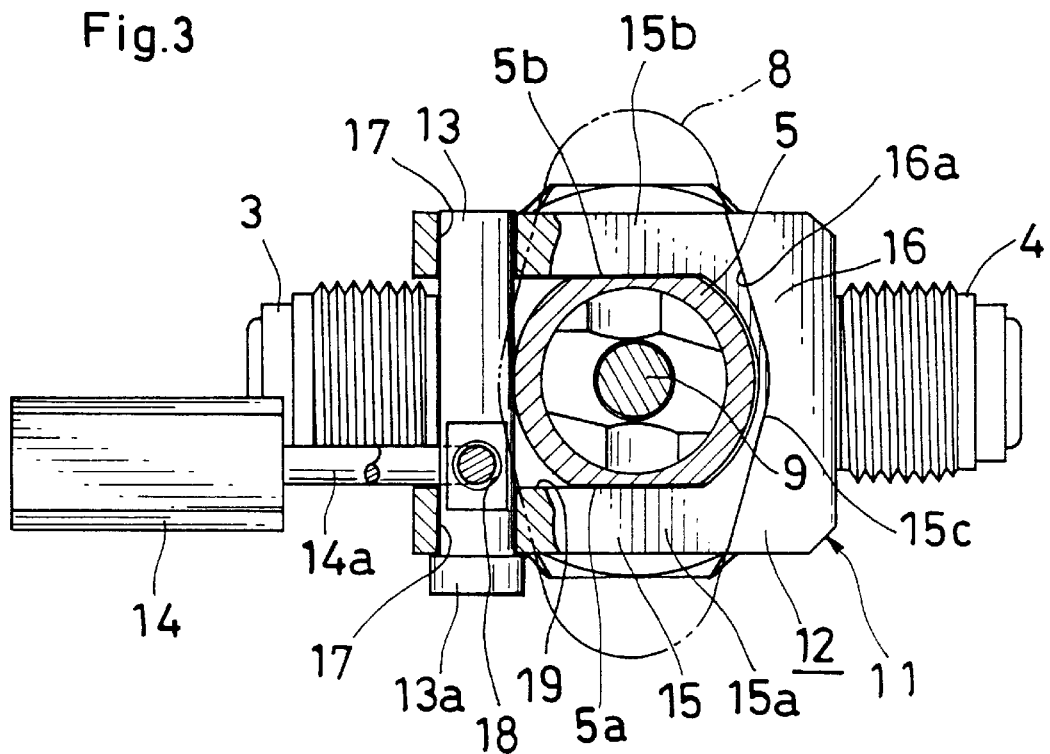
FIG. 3 is a fragmentary plan view partly broken away.

FIGS. 1 to 3 show a fluid controller 1, and a channel opening-closing handle locking device 11 of the invention.

The fluid controller 1 shown is a known diaphragm valve and comprises a body 2 having an inlet pipe joint portion 3 and an outlet pipe joint portion 4, a bonnet 5 generally in the form of a hollow cylinder and fitted around an upper portion of the body 2, a bonnet nut 6 for fixing the bonnet 5 to the body 2, a panel nut 7 fitted around the bonnet 5, a channel opening-closing handle 8 rotatable clockwise or counterclockwise, a valve stem 9 movable upward or downward with the rotation of the handle 8, and a diaphragm (not shown) for effecting or blocking communication between an inlet passageway and an outlet passageway within the body 2 with the upward or downward movement of the valve stem 9.

The inlet pipe joint portion 3 projects from the body 2 leftward, while the outlet pipe joint portion 4 projects therefrom rightward. The handle 8, which is generally elliptical when seen from above, has its length oriented in the left-to-right direction and is aligned with the inlet and outlet pipe joint portions 3, 4 (the position indicated in a chain line in FIG. 2) when fully opening the channel of the controller. When turned counterclockwise through 90 degree from this position, the handle 8 is in a full closing position (indicated in solid lines in FIGS. 1 and 2, and in a chain line in FIG. 3).

The locking device 11, which is adapted to lock the handle 8 in its full closing position, comprises a support 12 having a body fitting opening 19 and fixed to the controller body 5, a stopper 16 integral with the support 12 and engageable with the handle 8 for preventing the rotation of the handle, and a lock 14 in combination with a key to be possessed by a person capable of disengaging the stopper 16.

The support 12 comprises a first member 15 generally U-shaped and comprising a right wall (bottom wall) 15c, and front and rear side walls 15a, 15b for holding the controller bonnet 5 therebetween from the front and rear sides, and a second member 13 in the form of a rod and extending between and attached to the free ends of the front and rear side walls 15a, 15b for preventing the first member 15 from slipping off the bonnet 5.

The bonnet 5, which is generally cylindrical, is locally cut to remove outer peripheral front and rear exposed portions immediately below the handle 8, and is thereby formed with front and rear flat faces 5a, 5b parallel to each other and opposed respectively to the front and rear side walls 15a, 15b of the first member 15 as shown in FIG. 3. The spacing between the front and rear side walls 15a, 15b is approximately equal to the distance between the parallel front and rear flat faces 5a, 5b of the bonnet 5.

The first member 15 is fitted from the right side around the exposed portion of the bonnet 5 having the front and rear flat faces 5a, 5b parallel to each other. The surface of the right wall 15c of the first member 15 in contact with the bonnet 5 is in the form of a circular arc in horizontal section to extend along the bonnet 5. Thus, the first member 15 and the second member 13 define the body fitting opening 19 having an approximately rectangular horizontal section which is arched only at the right side as seen in FIG. 3.

The stopper 16 is formed on the upper side of the right wall 15c of the first member 15 so as to project upward beyond the front and rear side walls 15a, 15b. The stopper 16 has a face 16a for contact with the handle 8. The contact face 16a is shaped in conformity with the shape of the right side face of the handle 8 in the chain-line position shown in FIG. 3 to prevent the rotation of the handle 8. The lower-end portion of the first member 15 is so shaped as not to interfere with the exposed bonnet portion which is not formed with the front and rear flat faces.

The front and rear side walls 15a, 15b of the first member 15 are formed with respective insertion bores 17 extending therethrough in the front-to-rear direction and aligned with each other. The second member 13, which is a pin having a head 13a, is inserted through the bore 17 of the front side wall 15a from the front thereof and through the bore 17 in the rear side wall 15b. The second member 13 has a portion of reduced diameter positioned a small distance to the rear of the front side wall 15a and formed with a through bore 18 vertically extending therethrough. The lock 14 is attached to the second member 13 using this bore 18 for preventing the second member 13 from slipping off. The lock 14 may be, for example, a commercial padlock. The shackle 14a of the lock is passed through the bore 18 and then fitted into the body of the lock 14, whereby the front side wall 15a is held between the shackle 14a of the lock 14 and the head 13a of the second member 13, which in turn is prevented from slipping off. Consequently, it becomes impossible to turn the handle 8 unless the lock 14 is released with the key.

The controller 1 is assembled by fitting the bonnet 5 to the body 2 with the flat faces 5a, 5b facing toward the front and rear respectively, fastening the bonnet 5 to the body 2 with the bonnet nut 6, determining the full-closed position of the valve stem 9 by moving the valve stem 9 upward or downward, and fixing the handle 8 to the valve stem 9 so that when the valve stem 9 is in its full-closed position, the handle 8 is in the full closing position. The handle 8 can then be locked in the full closing position as previously mentioned. The handle 8 is made lockable in the full opening position by fitting the bonnet 5 to the body 2 with the flat faces 5a, 5b facing toward the left and right respectively in assembling the controller 1 and thereafter following the same procedure as above.

The contact face 16a of the stopper 16 for the handle 8 is shaped in conformity with the shape of the right side face of the handle 8 in its full closing position according to the embodiment described, whereas the shape of the stopper 16 is not limited to this but can be modified variously insofar as the stopper is engageable with the handle 8 to prevent the rotation thereof. Although having a generally elliptical shape when seen from above, the handle 8 can be shaped otherwise to obtain a handle locking device similarly insofar as it is not perfectly cylindrical. The channel opening-closing handle, if perfectly cylindrical, may be provided with a portion engageable with the first member, whereby a handle locking device can be obtained with the same function as described above.

FIGS. 4 to 8 show another handle locking device 21 as a second embodiment for use with a fluid controller which is the same as in the case of the first embodiment. Like parts are therefore designated by like reference numerals and will not be described repeatedly.

The locking device 21 is adapted to lock a channel opening-closing handle 8 in its full closing position, and comprises a support 22 having a rectangular body fitting opening 23 and fixed to a controller bonnet 5, a stopper 26 nonrotatably mounted on the support 22, movable upward and downward relative thereto and engageable with the handle 8 for preventing the rotation of the handle, and a lock 27 in combination with a key to be possessed by a person capable of disengaging the stopper 26.

The stopper support 22 is formed by a front segment (first member) 24 and a rear segment (second member) 25 butting against and joined to the front segment 24, the two segments having the same shape. The stopper support 22 is in the form of a rectangular plate in its entirety and comprises a right segment 22a having the same height as parallel front and rear flat faces 5a, 5b of the bonnet 5, and a left segment 22b having a smaller height than the right segment 22a and supporting the stopper 26 thereon. The body fitting opening 23 is formed in the right segment 22a of the support 22, with part of the opening 23 formed also in the left segment 22b. The left segment 22b of the stopper support 22 is formed with a stopper fitting rectangular aperture 28 smaller than the opening 23 in front-to-rear width and elongated in the left-to-right direction.

The stopper 26 comprises a contact portion 29 extending in the front-to-rear direction and having a right side providing a contact face 29a for the handle 8, a horizontal base portion 30 extending leftward from the midportion, with respect to the front-to-rear direction, of the contact portion 29, and a vertical portion 31 extending downward from the base portion 30 and slidably fitted in the aperture 28.

The contact portion 29 has a front-to-rear length equal to the front-to-rear width of the stopper support 22. The contact face 29a is shaped in conformity with the shape of the left side face of the handle. The horizontal base portion 30 is greater than the stopper fitting aperture 28 in horizontal cross sectional area, and is supported by the inner peripheral portion of the left segment 22b defining the aperture 28. The vertical portion 31 has a lock bore 32 extending therethrough in the front-to-rear direction.

The lock 27 is the same as the one used in the first embodiment.

Figure 4:
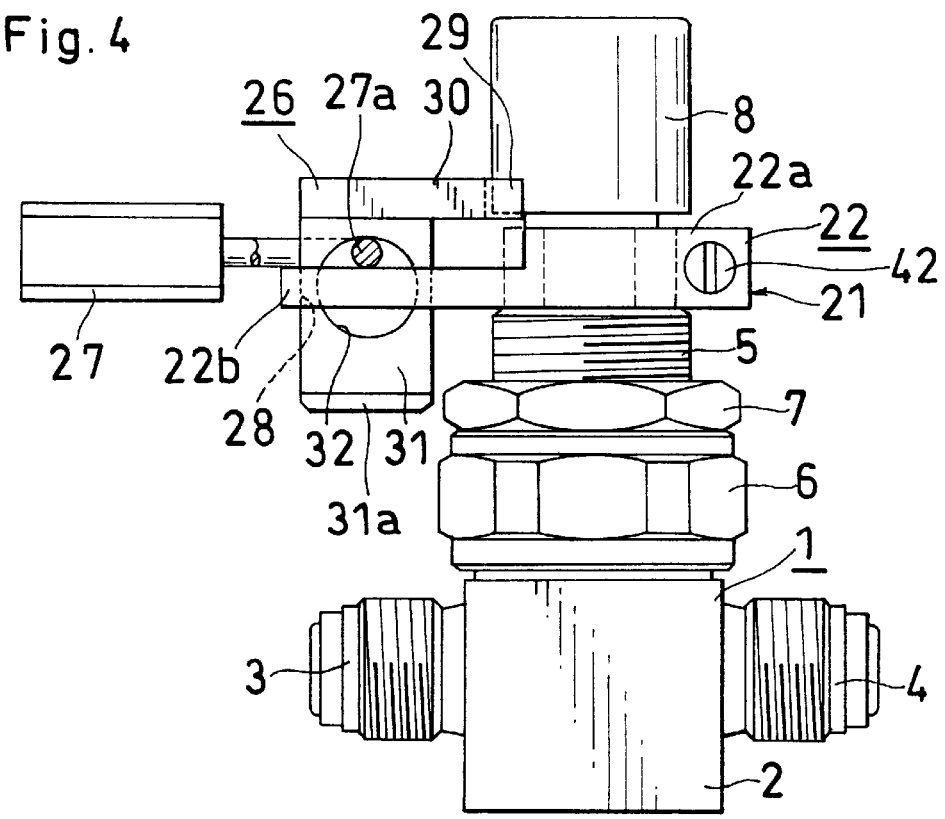
FIG. 4 is a front view partly broken away and showing a second embodiment of channel opening-closing handle locking device according to the invention.
Figure 5:
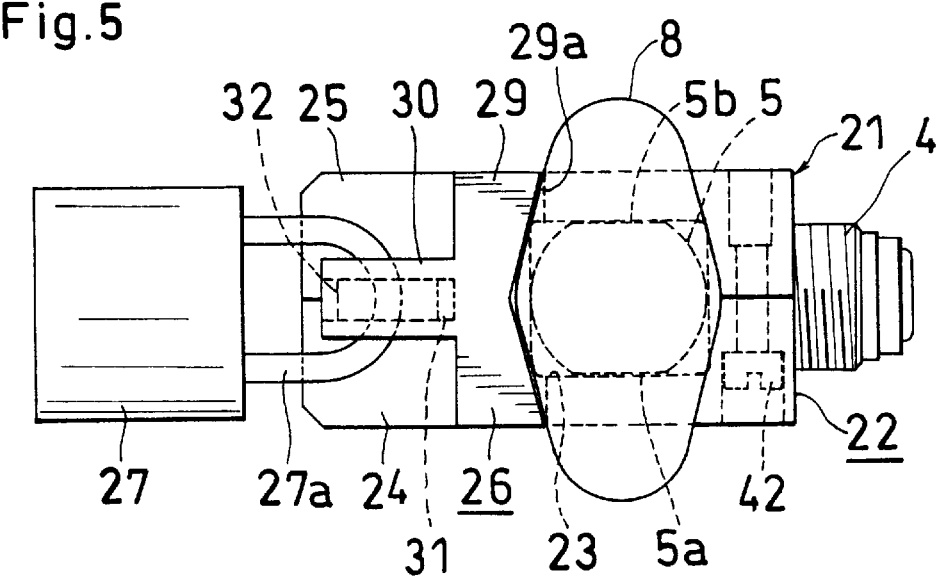
FIG. 5 is a plan view of the same.
Figure 6:
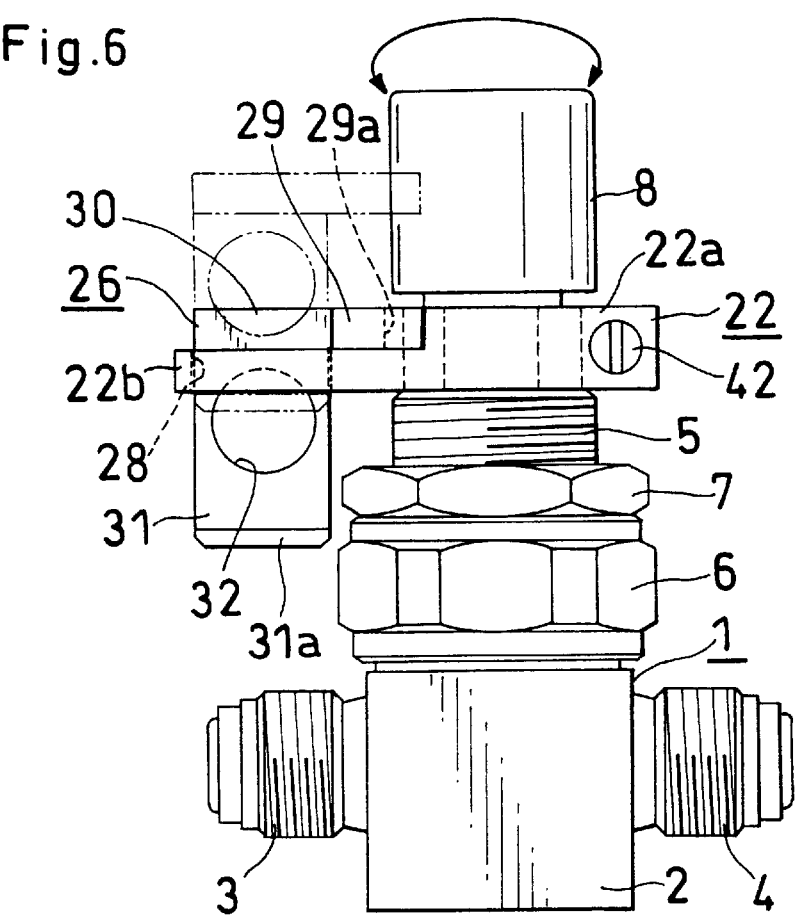
FIG. 6 is a front view of the second embodiment as released from a lock.

When the handle 8 is released from the lock 27, the upper surfaces of the contact portion 29 and the base portion 30 are flush with the upper surface of the right segment 22a of the stopper support 22, and the stopper 26 is held out of engagement with the handle 8 as shown in FIG. 6. The stopper 26 thus positioned is then lifted, and the shackle 27a of the lock 27 is passed through the lock bore 32 brought to an exposed position above the left segment 22b of the support 22, whereby the stopper 26 is projected upward beyond the right segment 22a of the support 22 by an amount corresponding to the thickness of the shackle 27a, into engagement with the handle 8 as shown in FIG. 4. It is impossible to turn the handle 8 in this state unless the handle is released from the lock 27 using the key.

Thus, the stopper 26 is mounted on the support 22 so as to be movable upward or downward between an upper position (locking position) where it is engaged with the handle 8 and a lower position (unlocking position) where it is out of engagement with the handle, and the locking position or the unlocking position is alternatively selectable merely by moving the stopper 26 upward or downward. With the first embodiment, the handle 8 can not be unlocked unless the second member 13 is removed from the first member 15, whereas according to the second embodiment, the handle 8 can be unlocked merely by undoing the lock 27, hence a facilitated change-over between locking and unlocking.

The vertical portion 31 of the stopper 26 is formed at its lower end with a forwardly projecting edge 31a which engages with an edge of the apertured portion 28 when the stopper 26 is lifted to the chain-line position shown in FIG. 6 to prevent the stopper 26 from slipping out upward.

Figure 7:
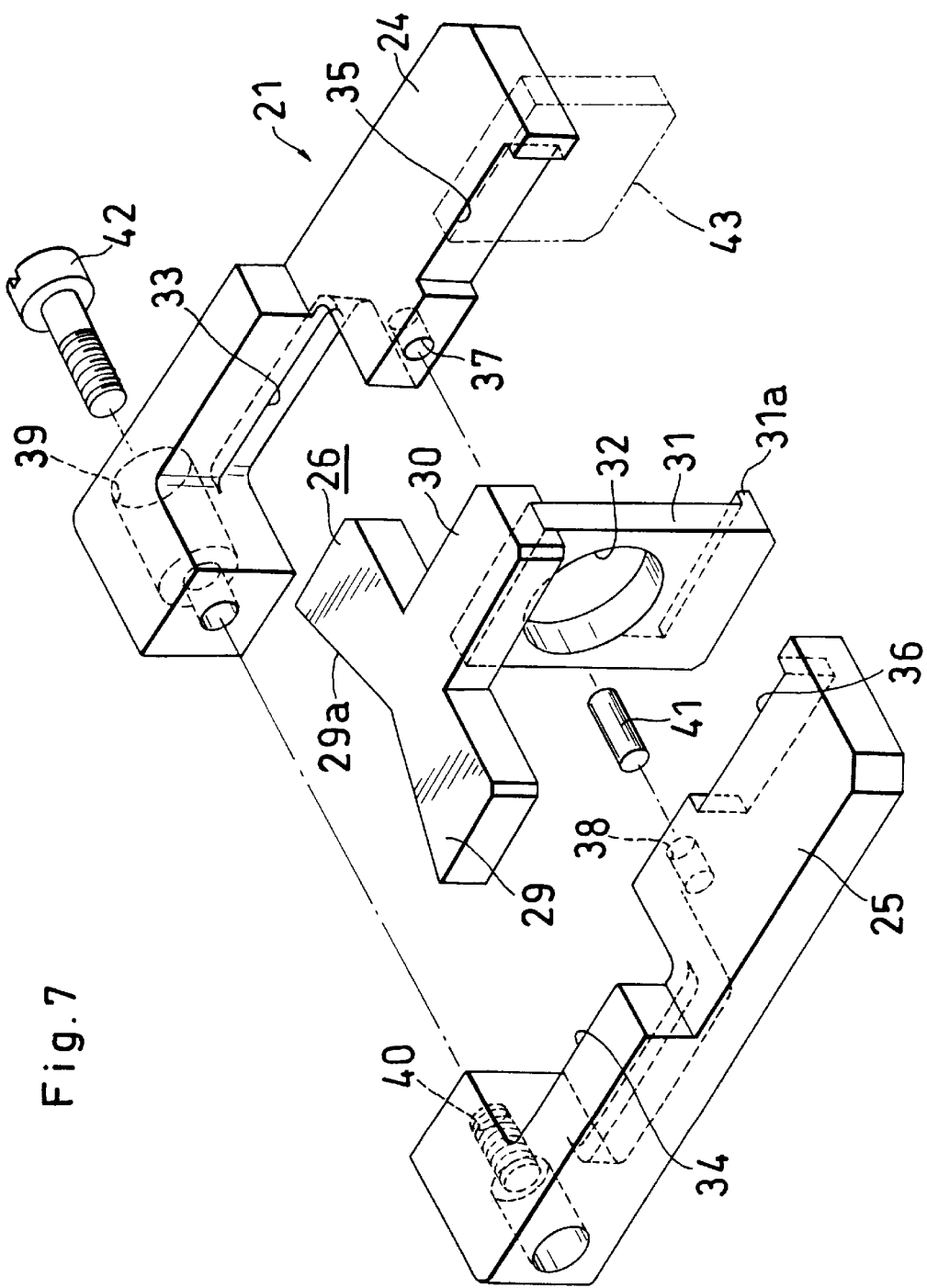
FIG. 7 is an exploded fragmentary perspective view of the second embodiment.

As shown in greater detail in FIGS. 7 and 8, the butting portions of the first and second members 24, 25 are formed with recesses 33, 34 rectangular in horizontal section for forming the body fitting opening 23 when the two members 24, 25 are joined, and with recesses 35, 36 rectangular in horizontal section for similarly forming the stopper fitting aperture 28. Pin bores 37, 38 extending in the front-to-rear direction are formed in respective butting faces between the recesses 33, 34 and the recesses 35, 36. Further a bolt hole 39 is formed in the right end of the first member 24, and a threaded bore 40 in the right end of the second member 25. A connecting pin 41 is tightly fitted into the bores 37, 38 of the members 24, 25, while a flat fillister head screw 42 is inserted through the bolt hole 39 of the first member 24 and driven into the threaded bore 40 of the second member 25, whereby the two members 24, 25 are fastened together.

The lower ends of the recesses 33, 34 of the members 24, 25 forming the opening 23 are made larger than the remaining upper portions of the recesses 33, 34 so as not to interfere with the exposed portion of the bonnet 5 where the parallel front and rear flat faces are not formed. Although not shown, a pin is press-fitted in the bolt hole 39 for concealing the head of the screw 42 for fastening the two members 24, 25 together.

Preferably, the first member 24 is integrally provided with a vertical cover plate 43 extending from its underside as indicated in chain lines in FIG. 7. When the stopper 26 is in its lower position, the cover plate 43 is positioned in parallel to the stopper vertical portion 31 as shown in FIGS. 9 and 10 to conceal the lock bore 32. The handle 8 then can not be fastened with the lock 27 unless the stopper 26 is lifted to its upper position. This serves to obviate the error of fastening the stopper 26 in its lower position with the lock 27.

What is claimed is:

1. A device for locking a channel opening-closing handle of a fluid controller in a full opening or full closing position, for attachment to a handle having a non-circular contour when seen from above, and being rotatable relative to a body of the fluid controller, and arranged to be mounted thereon so as to be unmovable upward, said locking device comprising a stopper support having a body fitting opening for fixing to said controller body, and a stopper nonrotatably provided on said stopper support mounted thereon so as to be movable upward and downward between a locking position in which the stopper is arranged to engage with an outer side face of the handle and prevents rotation of the handle, and an unlocking position in which the stopper is out of engagement with the handle, the stopper support being formed by a first member and a second member joined to each other, and each of the first and second members is formed with a recess and another recess for forming the body fitting opening and a stopper fitting aperture, respectively.

2. A locking device according to claim 1, wherein the stopper is arranged to be slidably fitted in the stopper fitting aperture.

3. A locking device according to claim 1 or 2, wherein when the two members are joined, the stopper has a vertical portion slidably fitted in the aperture and formed with a lock attaching bore.

4. A device for locking a channel opening-closing handle of a fluid controller in a full opening or full closing position, for attachment to a handle having anon-circular control when seen from above, and being rotatable relative to a body of the fluid controller and arranged to be mounted thereon so as to be unmovable upward, said locking device comprising a stopper support having a body fitting opening for fixing to said controller body, and a stopper nonrotatably provided on said stopper support mounted thereon so as to be movable upward and downward between a locking position in which the stopper is arranged to engage with an outer side face of the handle and prevent rotation of the handle, and an unlocking position in which the stopper is out of engagement with the handle, the stopper support being formed by a first member and a second member joined to each other, and each of the first and second members is formed with a recess and another recess for forming the body fitting opening and a stopper fitting aperture, respectively, when the two members are joined, the stopper having a vertical portion slidably fitted in the aperture and formed with a lock attaching bore.

* * * * *